United States Patent [19]

Messer

[11] 4,178,243
[45] Dec. 11, 1979

[54] METHOD AND APPARATUS FOR CONTROLLED DEWATERIZING OF COAL TREATMENT UNDERFLOW

[75] Inventor: Leonard Messer, Pittsburgh, Pa.
[73] Assignee: American Minechem Corporation, Coraopolis, Pa.
[21] Appl. No.: 886,709
[22] Filed: Mar. 15, 1978

Related U.S. Application Data

[63] Continuation of Ser. No. 630,214, Nov. 10, 1975, abandoned.

[51] Int. Cl.² .................. B01D 21/01; C02B 1/20
[52] U.S. Cl. .................................. 210/54; 210/67; 210/73 R; 210/103; 210/96.1
[58] Field of Search .................. 209/5, 463, 464; 210/10, 42 R, 49, 51–54, 66, 67, 73 R, 83, 96 R, 113, 162, 103, 104

[56] References Cited

U.S. PATENT DOCUMENTS

| | | | |
|---|---|---|---|
| 1,695,021 | 12/1928 | Puryear | 209/464 |
| 1,986,897 | 1/1935 | Shaw | 210/19 |
| 3,128,786 | 4/1964 | Badgett | 210/96 R |
| 3,281,594 | 10/1966 | Garrison | 210/96 R |
| 3,423,313 | 1/1969 | Messer | 210/73 R |
| 3,472,383 | 10/1969 | Daniels | 210/298 |
| 3,737,032 | 5/1973 | Buckitt | 209/464 |
| 3,923,652 | 12/1975 | Condolios et al. | 210/67 |

Primary Examiner—Charles N. Hart
Assistant Examiner—Peter A. Hruskoci
Attorney, Agent, or Firm—Reed, Smith, Shaw & McClay

[57] ABSTRACT

A coal treatment underflow of an aqueous slurry of fine solid particles is dewaterized by first adding to the aqueous slurry a preferably high molecular weight flocculant lyophobic to water and lyophilic to fine solid particles to form a mixture. The mixture is charged to a thickener where flocculated solids are settled from the mixture and water separated from the mixture. During settling, the flocculated solids are preferably subjected to increased settling area and changing direction of liquid flow to increase the settling rate of the flocculated solids. A radiation beam is impinged on the flocculated solids transverse the direction of travel of the solids adjacent the discharge means from the thickener, and the impinged radiation beam is detected by detector means to continually measure the density of the flocculated solids preferably by degree of absorption of radiation. The detector in turn produces an electrical signal proportional to the density of the flocculated solids that automatically regulates and controls the rate of discharge of the flocculated solids from the thickener.

7 Claims, 5 Drawing Figures

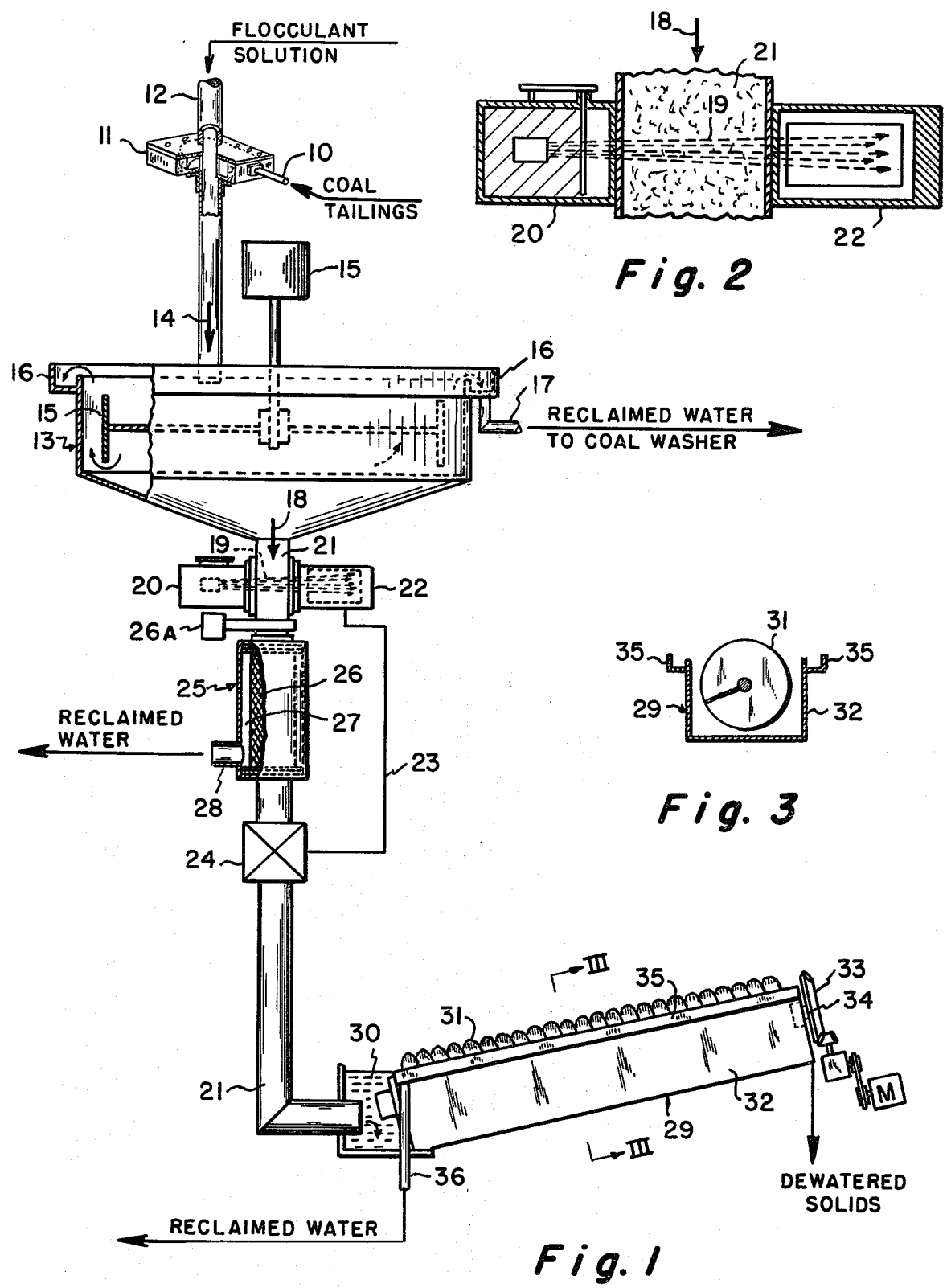

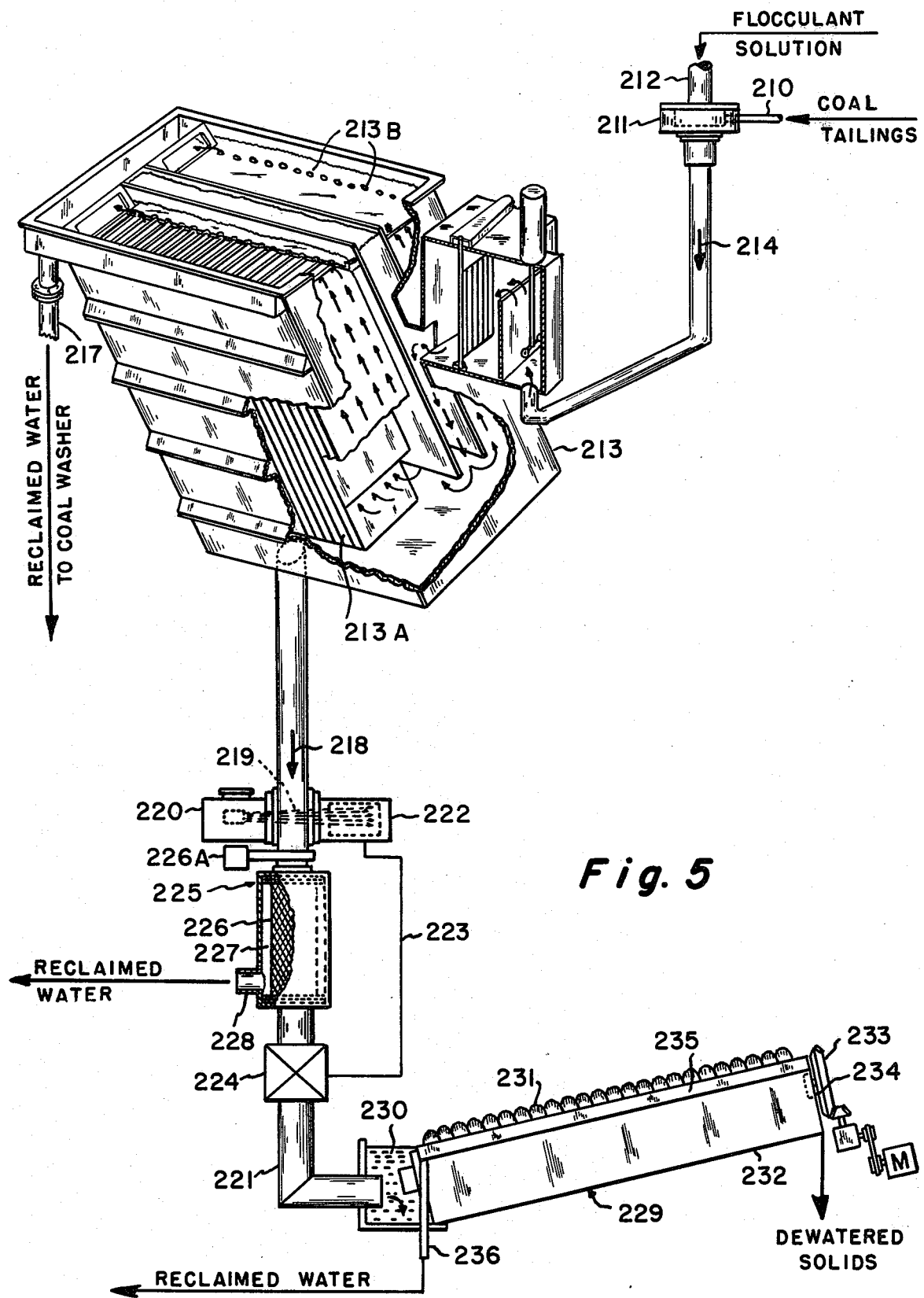

METHOD AND APPARATUS FOR CONTROLLED DEWATERIZING OF COAL TREATMENT UNDERFLOW

This is a continuation, of application Ser. No. 630,214 filed Nov. 10, 1975 abandoned.

FIELD OF THE INVENTION

The present invention relates to coal processing, and particularly the dewatering of the tailings from a coal washing plant.

BACKGROUND OF THE INVENTION

Mechanized coal preparation plants use large quantities of water to separate fine particles of coal and other material from the graded coal aggregates. The underflow from the wash treatment typically contains 5 to 15% solids of coal and ash having particle sizes in the range less than 150 microns (i.e. 100 mesh Tyler sieve). Typically, the underflow is flocculated by addition of, for example, starch or polyacrylamide in a thickener. The solids content of the underflow is increased to typically about 50% in the thickener, and water reclaimed for recirculation to the coal washing plant.

The thickened underflow is then generally pumped to a settling pond (or "lagoon") where the solids settle out and the reclaimed water is made available for reuse in the coal washer. Such settling ponds are, however, increasingly difficult to construct and maintain. There is often limited land available at the coal washing plant, which requires pumping of the underflow over long distances at substantial cost. Moreover, even where there is land available adjacent the washing plant, environmental laws have made such settling ponds difficult and expensive to construct and operate in compliance with state and federal regulations. And, permanent use of settling ponds presents the problems and costs of disposing of the sediment.

Various processes and apparatus have been proposed to eliminate the use of settling pond, i.e. filter presses, vacuum filters, centrifuges, and aqua-pelletizers as described in U.S. Pat. Nos. 3,606,947 and 3,630,893. The main disadvantages of these techniques are restricted and variable capacity, high capital and operating costs and high manpower requirements. Almost invariably these techniques still are preceded by a conventional thickener to increase the solids concentrations of the feed. Further, a filter press is typically a batch-wise process whose cycle can vary widely, e.g., 1 to 4 hours; a conventional vacuum filter has unique difficulties in separating the fine particles present in the tailings; and a commercial centrifuge readily ruptures and breaks-down conventional flocs requiring the use of expensive shear-resistant flocculants. Finally, the aqua pelletizer is a specialized expensive piece of equipment that requires a trained operator.

Another more efficient process and apparatus has been the cone thickener, which can obviate the need for a preceeding thickening operation as well as succeeding dewaterizing operation. The cone thickener is generally cylindo-conical in shape with considerably less settling area and considerably more depth than the conventional thickener. The feed premixed with flocculant is charged to the center top of the thickener. The solids settle through the thickener aided by gentle stirring to consolidate the flocs, and form a plug at the bottom apex of the cone. Clarified water overflows the periphery about the top of thickener and is reclaimed for use in the coal washing plant.

The main problem with the use of the cone thickener is the wide variation in the nature, size and percentage of solids content of the underflow even though the coal may originate from the same seam. This problem is compounded by recent processes that extract coal fines from the underflow by froth flotation or hydrocarbon beneficiation, see U.S. Pat. No. 3,665,066. These processes reclaim the coal fines leaving the tailings with a solids content generally of only 1 to 5%. Although methods are available for automatic control of the feed and variation of the flocculant additional relative to the solids content thereof, such systems do not satisfactorily moderate the variations in solids concentration of the tailings.

Maximum solids pressure is essential to obtain discharge of high solids concentrations. A cone is therefore typically operated at or near the maximum depth of thickened solids compatible with clear water from the overflow. Ideally, the solids content of the discharge is maintained substantially constant, with the rate of discharge controlled by the density of the solids concentration at the discharge; but solids concentrations at the discharge was not heretofore be directly measured and controlled. Rather, generally the differential pressure vertically in the cone due to the suspended solids is measured, and on reaching a given differential pressure, the pneumatically controlled valve at the bottom of the cone is automatically opened until the pressure drops below a given value when the valve is automatically closed. This system is sensitive to changes in solids concentration and therefore has not been satisfactory. An alternative proposal has been to continuously extract a sample from near the discharge point of the cone and pump the sample through specific gravity measuring device, insensitive to fluctuations in flow rate and pressure, returning the sample to the cone at a higher level— the specific gravity measurement being used to continuously control the discharge through the valve at the apex of the cone. This alternative is slow in response so that there is a time lag and in turn a variation in the solid concentrations of the discharge.

The present invention overcomes these disadvantages and difficulties by directly measuring the density of the solid concentrations of the discharge and controlling the rate of discharge without any appreciable time lag. The solids content of the discharge is in turn improved and more constant. The present invention also permits direct control of the solid concentrations discharged from supplemental dewatering devices utilizable with thickeners, such as device described in applicant's U.S. Pat. No. 3,423,313, as well as a simple, inexpensive method of further controlled dewaterizing on discharge from the thickener.

SUMMARY OF THE INVENTION

Method is provided for dewaterizing an aqueous slurry of fine solid particles and particularly tailings of a coal treatment underflow. The coal fine particles are preferably first separated from the underflow by froth flotation or beneficiation so that the tailings content is primarily non-coal solids of preferably between 2 and 10%. A flocculant lyophobic to water and lyophilic to the fine solid particles is then added to the tailings to form a mixture. Said flocculant is of a high molecular weight greater than 100,000, preferably greater than 1,000,000 and most desirably between 3,000,000 and 15,000,000.

The mixture is charged to a thickener and generally a cone or inclined plate thickener, where the flocculated solids are settled from the mixture and water separated from the mixture. Simultaneously with settling, the flocculated solids are preferably subjected to increased settling area and changing direction of liquid flow to increase the settling rate of the flocculated solids.

A radiation beam from a radiation source, typically of gamma radiation, is impinged on the flocculated solids transverse to the direction of travel of the solids adjacent the discharge means for the dewaterized solids from the thickener. The impinged radiation beam is detected by detection means to continually measure the density of the flocculated solids on which the radiation beam impinges. Although this may be done by detecting the backscatter of, for example, electron radiation, preferably the measurement is accomplished by passage of a gamma radiation beam through the flocculated solids transverse to the direction of travel of the flocculated solids and measuring the degree of absorption of radiation by the flocculated solids detected by the detector means.

The detector means in turn produces an electrical signal proportional to the impinged radiation detected and to the density of the flocculated solids. This electrical signal is utilized to automatically regulate and control a valve means adjacent the discharge means and in turn the rate of discharge of the flocculated solids from the thickener. Thus the rate of discharge of the flocculated solids from the thickener is directly controlled by measuring the density of the solid concentrations of the discharge without any appreciable time lag.

Preferably, at the discharge from the thickener the flocculated solids are further dewatered by passage of the flocculated solids through a foraminal conduit section, where the flocculated solids are vibrated to remove water therefrom. Preferably the vibration is accomplished by either physically vibrating the foraminal conduit section or by ultrasonic means. In either case, the entrained water in the flocculated solids is removed through the foraminal conduit section and the additionally dewatered flocculated solids removed from that section.

Preferably the flocculated solids are still further dewaterized by kneading the flocculated solids upon discharge from the thickener. This is accomplished by discharge of the flocculated solids into a sump of an inclined dewaterizing screw and passage of the flocculated solids through the inclined dewaterizing screw. The dewaterizing screw has an incline and screw angle so that the solids are rotated and impinged on themselves to perform the kneading and dewaterizing. The dewaterizing screw has overflow portions through which the water squeezed from the flocculated solids by kneading can escape from the screw and be removed from the flocculated solids. The further dewatered flocculated solids are then discharged from the elevated end of the inclined dewaterizing screw for disposal or by-product use.

Other details, objects and advantages of the invention become apparent as the following description of the presently preferred embodiments presently preferred methods for practicing the same proceeds.

BRIEF DESCRIPTION OF THE DRAWINGS

In the accompanying drawings are shown presently preferred embodiments of the invention and are illustrated presently preferred methods of practicing the same, in which:

FIG. 1 is a schematic of a method for dewaterizing an aqueous slurry of fine solid particles from a coal treatment underflow;

FIG. 2 is an enlarged fragmentary portion of FIG. 1;

FIG. 3 is a cross-sectional view taken along line III—III of FIG. 1;

FIG. 5 is a schematic of a third, alternative method for dewaterizing an aqueous slurry of fine solid particles from a coal treatment underflow.

DESCRIPTION OF THE PREFERRED EMBODIMENTS

Figure 4:
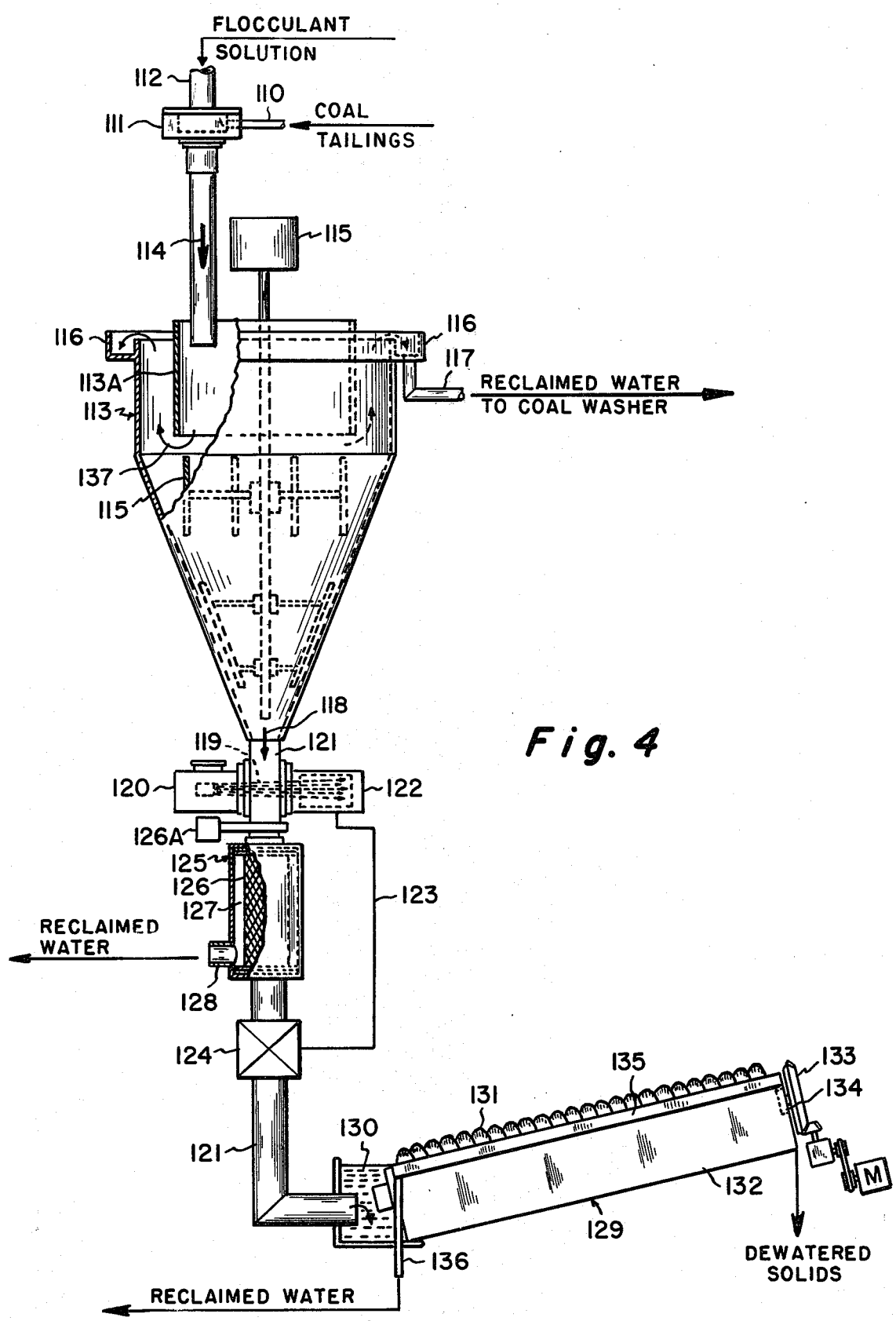
FIG. 4 is a schematic of a second, alternative method for dewaterizing an aqueous slurry of fine particles from a coal treatment underflow.

Referring specifically to FIG. 1, a method is illustrated for dewaterizing an aqueous slurry of fine solid particles preferably of coal, coke or other carbonaceous material, and typically tailings of a coal treatment underflow from a coal washing plant. Although the underflow may be dewaterized directly, preferably the fine particles of coal are first separated from the underflow by froth flotation or beneficiation with a hydrocarbon such as fuel oil or kerosene. These processes are known in the art and need not be detailed here. See, for example, U.S. Pat. No. 3,665,066 for a detailed description of the beneficiation process. The tailings with the coal fines removed is typically a clay and water composition of 1 to 5 percent solids.

Tailings 10 are circulated through suitable piping or conduit to flocculant mixer 11 where the tailings are dispersed in flocculant solution 12. The tailings preferably are an aqueous slurry, with substantial coal fines removed, containing between 2 and 10 percent solids by weight typically mostly of clay fines. The flocculant solution is a dilute solution of water and flocculant, where the flocculant is a high molecular weight material lyophobic to water and lyophilic to fine solid particles. "Lyophobic" as used herein means that, in a disperse system, there is a marked affinity (wettability) between a disperse component and the dispersion medium and/or another disperse component. Some examples are glue and water, rubber and benzene. "Lyophilic" as used herein means that, in a disperse system, there is substantially no affinity (wettability) between a disperse component and the dispersion medium and/or another disperse component. Examples are colloidal "solutions" of metals.

Suitable flocculants for this purpose are high molecular weight polyacrylamides $(CH_2CH\ CONH_2)_n$, polyethylene oxides $(OCH_2CH_2)_n$, polyethylene imines $(CH_2CH_2NH)_n$, polyvinyl pyrolidones $(C_6H_9NO)_n$, polysaccharides $(C_6H_{10}O_5)_n$, and copolymers and mixtures of these polymers, with varying side and end groups, of greater than 100,000 molecular weight. Such high molecular weight polymers are preferably greater than 1,000,000 molecular weight, and most desirably between 3,000,000 and 15,000,000 molecular weight, with 9,000,000 molecular weight considered optimum. Higher molecular weight polymers of up to and greater than 20,000,000 may be used; however, such overly high molecular weights are not preferred because they are unduly expensive to make and do not provide residence times during flocculation that result in high clarity in the reclaimed water. Flocculants available commercially which may be utilized to prepare flocculant solution 12 are set forth in Table I below.

TABLE I

| Manufacturer | Tradename of Flocculant |
| --- | --- |
| Allied Colloids (Y.C.L. Grade) | Polyflok 91APA |
| Allied Colloids (Y.C.L. Grade) | Polyflok 93APA |
| Allied Colloids (Y.C.L. Grade) | Polyflok 95APA |
| Allied Colloids (Y.C.L. Grade) | Polyflok 63 AP/W |
| Allied Colloids (Y.C.L. Grade) | Polyflok 13CL |
| Allied Colloids | Filtaflok 25AP |
| Allied Colloids | Magnafloc R155 |
| Allied Colloids | Magnafloc R156 |
| Allied Colloids | Magnafloc R270 |
| Allied Colloids | Magnafloc R140 |
| Allied Colloids | Magnafloc LT22 |
| Allied Colloids | Magnafloc LT24 |
| Allied Colloids | Magnafloc LT25 |
| Allied Colloids | Magnafloc LT26 |
| Badische-Anilin-& Soda Fabrik,AG | Sedipur TF |
| Badische-Anilin-& Soda Fabrik,AG | Sedipur LK4011 |
| Badische-Anilin-& Soda Fabrik,AG | Sedipur LK4034 |
| Stockhausen | Praestol 444K |
| Stockhausen | Praestol 114 |
| Stockhausen | Praestol 115 |
| Stockhausen | Praestol 2850 |
| Hercules Powder | Hercolfoc 810 |
| Hercules Powder | Hercofloc 813 |
| Hercules Powder | Hercofloc 817 |
| Nalco | Nalfloc N603 |
| Nalco | Nalfloc N610 |
| Nalco | Nalfloc N671 |
| Nalco | Nalfloc N672 |
| Nalco | Nalfloc N673 |
| Nalco | Nalfloc A373 |
| Nalco | Nalfloc A375 |
| Nalco | Nalfloc A378 |
| American Cyanamid | Superfloc 500 Series |
| American Cyanamid | Superfloc 800 Series |
| American Cyanamid | Superfloc 992 |
| American Cyanamid | Superfloc 521 |
| Dow Chemical | Purifloc C31 |
| Dow Chemical | Purifloc C32 |
| Dow Chemical | Separan AP273 |
| B.T.I. | C.110 |
| B.T.I. | A.110 |
| B.T.I. | A.130 |
| B.T.I. | A.150 |
| B.T.I. | A.100 (PWG) |
| B.T.I. | A.110 (PWG) |
| B.T.I. | A.130 (PWG) |
| B.T.I. | A.150 (PWG) |
| B.T.I. | A.100 (PWG) |

Such lyophobic flocculants are mostly anionic; however, cationic flocculants are available and are preferred as an alternative or a complement to anionic flocculants in certain applications. Specifically, anionic flocculants are generally not effective to flocculate very small size fine particles, which generally carry a negative surface charge, while the cationic or positively charged flocculants are able to neutralize the surface charge of such small particles and produce faster settling rates and water of higher clarity. However, cationic flocculants generally tend to be more expensive because the materials needed to make the polymer cationic are generally higher in price. In addition, cationic flocculants tend not to be as efficient in flocculation of large particle fines because cationic flocculants generally are of lower molecular weight than anionic flocculants. Cationic flocculants also tend to be more difficult to dissolve and, therefore, reduce the speed and ease with which the flocculant solution may be prepared. In addition, non-ionic flocculants of high molecular weight may be used in certain applications where the composition and nature of the solid fines permit.

Flocculant solution 12 is preferably prepared in dilute solution by known procedures. The object of the preparation is to disperse the lyophobic flocculant, which is in dry powder form, in water without producing agglomerates of the powder and without degradation of the high molecular weight polymers, which are sensitive to the shear forces. Manual mixing is generally not preferred because of the time and care necessary to avoid the formation of gelatinous lumps or agglomerates, which are ineffective and wasteful. Preferably, the flocculant solution is automatically prepared batch-wise by use of large mixing and stock tanks. The flocculant solution is prepared in the mixing tank utilizing masterbatching dispersion. The preparation is preferably commenced by introducing water to the mixing tank until the impeller is covered. Then, the water and flocculant powder are simultaneously dispersed and introduced to the mixing tank through a disperser unit such as the Bretby Autex disperser, which disperses the flocculant powder into a high velocity, thin water stream. When a measured amount of flocculant powder has been delivered to the mixing tank through the disperser, the mixing tank is further filled with water to a level corresponding to the desired dilution of the flocculant in the solution. Stirring with the impeller is thereafter continued until the flocculant powder is sufficiently dissolved in the water. When a signal is received from the stock tank indicating a low level in that tank, the prepared batch is emptied from the mixing tank to the stock tank, and the preparation cycle again commenced in the mixing tank. The dilution of the flocculant in the solution is thereby automatically controlled, and the only attention required is the addition of powdered flocculant to a suitable hopper at the mixing tank.

Flocculant solution 12 is then added to substantially tailings 10 in measured amounts of less than 0.2% by weight and preferably between 0.001 and 0.1% by weight of solids (dry weight) in tailings 10. Thorough mixing of the flocculant solution with the tailings is essential to efficient settling of the flocculated solids, but mixing usually requires application of shear to the polymer molecules from an impeller which ruptures and degrades the polymer. Accordingly, flocculant solution 12 is preferably added to tailings 10 in mixer 11 at the inlet to thickener 13 where high turbulence is produced without the use of an impeller. The turbulent condition provides for better distribution of the flocculant through the tailings and provides maximum surface contact with the fines in the tailings. Thorough mixing of the flocculant can be achieved by adding the flocculant solution at different inlets round the inlet of tailings 10 to mixer 11 and, if possible, at different points along the length of mixer 11 through which tailings is conducted to thickener 13. Alternatively, thorough mixing can be provided by spraying the flocculant solution into a cascade of the tailings, or spraying the flocculant solution into the tailings at several points as the tailings passes through a baffled launder.

The amount of flocculant solution 12 added to the tailings 10 is controlled (i) by dilution of the powder in solution and (ii) by addition of the solution to the slurry. Flocculant solution must be added to the tailings at a sufficient rate to produce lyophobic flocs, without causing carry-over and waste that accompanies overdosage; and the addition at proper rate is directly dependent on the concentration of solids in tailings 10, which concentration typically fluctuates widely during operation. Accordingly, the flocculant is preferably prepared in highly dilute solutions in water (typically 0.05% by weight) and large volumes of flocculant solution supplied to the slurry (0.4 liters per ton of solids [dry weight] processed) so that the dosing can be controlled and varied with precision corresponding to variation in the concentration solids in tailings 10.

To properly control the flocculant addition, both the flow rate and the solids concentration of tailings 10 must be measured, and the solids feed rate to thickener 13 continually computed. The flow of the tailings is preferably measured automatically and continually by a conventional magnetic flow meter; and the solid concentration of the tailings is preferably measured automatically and continually by a twin vibrating tube density meter which continually measures the specific gravity of the tailings. The specific gravity of the water and solids being presumably constant, the solids concentration in the tailings and in turn the solids flow rate to thickener 13 can be computed. Flocculant solution 12 can then be automatically metered into tailings 10 at a varied rate by utilizing a variable speed pump controlled by an electrical signal proportional to the computed solids flow rate, or by opening and closing a servovalve controlled by an electrical signal proportional to the difference between the measured flow rate of the flocculant solution and the desired flow rate for the computed solids flow rate.

Having achieved distribution of flocculant solution 12 through tailings 10 to form mixture 14, the mixture is discharged preferably centrally into, for example, conventional thickener 13 as shown. The flocculated solids settle to the bottom of thickener 13, while the flocculated particles, being lyophobic to water, continually exude water. The efficiency and rate of settling is primarily dependent on the molecular weight of the flocculant polymer and the percentage of flocculant to solids as above described. Preferably, the mixture is gently stirred by motor driven agitator 15, e.g. at 1 or 2 revolutions per minute, to release occluded water around and between the flocculated solids, as well as aid the release of water from the lyophobic flocs by increasing the pressure of the flocs on each other. A substantially clear layer of water is thus formed at the top of thickener 13, which is separated from the mixture through overflow 16. This reclaimed water 17 is then circulated through suitable conduit or pipe to a coal washing plant for reuse. Although it may in some instances be turbid, water 17 is sufficiently clear for reuse as processing water in a coal washing plant, i.e. less than 1% solids.

The lyophobic flocculated solids settle to the bottom of thickener 13 where they are removed as flocculated solids 18 containing typically between 35 and 70% solids, with 55 to 65% solids being most typical. Flocculated solids 18 are generally solids containing entrained water which may be disposed of in that form. Flocculated solids 18 may, however, be in slurry form. In any case, the solids content of flocculated solids 18 are directly dependent on the pressure of the solids above and around the flocs as they are removed at the bottom of thickener 13, as well as to a secondary extent by other variables. Accordingly, the solids content of flocculated solids 18 can be maintained substantially constant by controlling the discharge from the bottom of thickener 13 on direct measurement of the density of the solids concentrations of the discharge.

The density of the discharged flocculated solids 18 is measured by impinging a radiation beam 19 on the flocculated solids transverse to the direction of travel of the solids. Radiation beam 19 is positioned adjacent the discharge from thickener 13 preferably external of the thickener as shown. Alternatively, radiation beam 19 may be positioned adjacent the discharge from the thickener internal of the thickener, or external of the thickener spaced from the discharge outlet transverse the discharge conduit.

Radiation beam 19, which is typically gamma radiation, is produced from a radiation source within source housing 20 positioned along discharge conduit 21 adjacent thickener 13. Most desirebly the radiation source is Cesium 137 with a half-life of 33 years. Source housing 20 shields the radiation source to avoid exposure of the surroundings to radiation. Selection of the proper materials for the housing and the construction of the housing depend upon the source composition, the strength of the source and the desired intensity for the radiation beam 19. Generally, the radiation source is located in the center of a lead-filled, cylindrical steel housing. The radiation beam 19 is produced by suitable round or wedge shaped port in the source housing through which the radiation can be directed to impinge on the flocculated solids. Preferably, a shutter mechanism is provided on the port to permit closing of the radiation beam when the beam is not in use.

The radiation beam is absorbed by the flocculated solids in proportion to the density of the material on which the radiation beam impinges. The non-absorbed radiation from the beam passes through the flocculated solids and is detected by detector means 22 positioned opposite source housing 20 along discharge conduit 21. Detector means 22 detects the radiation passing through the flocculated solids and produces an electrical output signal directly proportional to radiation passing through the flocculated solids and inversely proportional to the density of the flocculated solids. Detector means 22 typically comprises an ionizing gas in a pneumatically sealed, electrically grounded chamber. When the detector beam is exposed to radiation, a DC current is generated that is directly proportional to the incoming radiation to detector means. The parameters of the detector means are selected and maintained to achieve a high signal-to-noise ratio and a high current sensitivity to changes in the level of incoming radiation. The electrical current from the detector means is amplified and otherwise processed by suitable electronic amplifiers and other circuits so that the detector means accurately measures the density of the flocculated solids on which the radiation beam impinges and produces an electrical signal proportional thereto.

An electrical signal from detector means 22 is conveyed via electrical lead 23 to servovalve 24 positioned in the discharge conduit 21. The servovalve 24 automatically regulates and controls the rate of discharge of flocculated solids from thickener 13 by the electrical signal conveyed to it from the detector means 22. Accordingly, the solid content of the flocculated solids 18 can be maintained substantially constant because the discharge is directly regulated and controlled based on the density of the flocculated solids discharged from thickener 13.

To further dewaterize the flocculated solids, the flocculated solids from thickener 13 are processed in dewaterizing device 25. The dewaterizing device 25 comprises a foraminal conduit section 26 of discharge conduit 21 through which the flocculated solids pass. Foraminal conduit section 26 is made of any suitable material of a reinforced, porous structure such as wire mesh, fabric or perforated metal or plastic. The foraminal conduit section 26 is surrounded by annular chamber 27 into which overflow water can be collected and discharged through drain pipe 28 to the coal washer or the thickener depending on the turbidity of the water. The porosity of the material forming the foraminal conduit section 26 is so dimensioned as to permit drainage of a maximum quantity of water and minimum quantity of solids into annular chamber 27. Dewaterizing device 26 also has vibrator 26A which either indirectly vibrates the flocculated solids by mechanically vibrating foraminal conduit section 26, or directly vibrates the flocculated solids by ultrasonics. Dewaterizing device 25 is particularly efficient in removing entrained water from the lyophobic flocs and occluded water from around and between the flocculated solids. The flocculated solids are discharged from dewaterizing device 25 through the servovalve 24 and an extension of discharge conduit 21, containing solids content of preferably about 50 to 60%.

Generally flocculated solids 18 as discharged from dewaterizing device 25 are a solids mixture of consistent composition and can be disposed of in that form. Alternatively, the flocculated solids may be circulated to a second thickener similar to thickener 13 where the solids may be further flocculated and dewaterized as above described. Preferably, however, the flocculated solids are further dewaterized by conveying them via discharge conduit 21 to the sump 30 of inclined screw dewaterizer 29. Screw dewaterizer 29 comprises a threaded screw 31 axially mounted in an inclined, open-top, cylindrical tank 32 extending from sump 30. Screw 31 is driven by power means 33 positioned at the elevated end 34 of the dewaterizer. Open-top tank 32 also has overflow troughs 35 extending along the length of screw 31 on either side, into which overflow water can flow.

Flocculated solids 18 discharged to dewaterizer 29 are kneaded as they pass along screw 31. The kneading is caused by the tumbling or rolling action of the solids on themselves under their own weight as they move up screw 31, which generally has a slope of 3 to 4 inches per foot. The kneading action is by definition gentle so as not to shear the flocs by virtue of the incline slope and the lead angle of screw 31, and the slow speed of rotation of screw 31, e.g. 1 to 20 revolutions per minute. The lead angle of the screw is generally between 50 and 80 degrees depending on the diameter of the screw. The kneading action releases water from the lyophobic flocs by increasing the pressure of the flocs on themselves, as well as releasing water from around and between the flocculated solids.

Concurrently the flocculated solids settle to the bottom of tank 32 and are dewatered as they are conveyed by screw above the water-line of sump 30. Thus dewatered flocculate solids of generally between 55 and 80% solids by weight are discharged from the inclined end 34 of dewaterizer 29. A relatively clear water is in turn formed at the top of the water-line and is overflowed into troughs 35. The water collected in troughs 35 is discharged from dewaterizer 29 through outlet 36, from where the water is circulated to the coal washing plant for use or to the thickener depending on the turbidity of the water.

Referring to FIG. 4, a second, alternative method is shown of dewaterizing an aqueous slurry of fine particles and particularly coal treatment underflow. The steps, compositions and apparatus are similar to that described in connection to FIG. 1 except for the thickener. Accordingly, the features and components have been correspondingly numbered to the features and components described in connection with FIG. 1, with the prefix "1" before each corresponding number.

The variant is that thickener 113 is a cone thickener that is cylindo-conical in shape, with a greater axial depth and smaller diameter than the thickener 13 shown in FIG. 1. These parameters, preferably together with the agitator 115, provide for greater dewaterizing of the flocculated solids in the thickener. In addition, mixture 114 is discharged into well 113A at the upper central portion of thickener 113. The flocculated solids, as they settle through the thickener, are thereby subjected to an increase in settling area and a change in direction of liquid flow, as shown by the arrows 137 on FIG. 4, as they emerge from the lower portion of well 113A. This action in turn increases the settling rate of the flocculated solids and adds to the efficiency of dewaterizing in the thickener and, together with agitator 115, may eliminate the need for dewaterizing device 125.

Referring to FIG. 5, a second alternative method is shown of dewaterizing an aqueous slurry of fine solid particles and particularly coal treatment underflow. The steps, compositions and apparatus are similar to that described in connection with FIG. 1. Accordingly, the features and components are correspondingly numbered to the features and components shown on FIG. 1 with the prefix "2" before each number.

The variant is the use of an inclined plate thickener such as the "Lamella" gravity settler manufactured by Parkson Corporation of Fort Lauderdale, Florida. In thickener 213 the mixture 214 is charged to the thickener 213 through the upper side portion, where it is circulated to the bottom of inclined plates 213A. The mixture flows into inclined plate 213A upwardly and exits at the top of plates 213A through flow distribution orifices 213B. Orfices 213B are sized to take a calculated pressure drop that forces the mixture to be evenly distributed over all of th inclined plates 213A. The flocculated solids settle out onto the surfaces of inclined plates 213A and slide downwardly into the bottom of thickener 213. Further thickening of the settled solids is accomplished by the pressure of the solids on themselves in the bottom of thickener. Additionally, a vibrator (not shown) may be positioned in the bottom of thickener 213 to further aid in dewaterizing and thickening of the solids. The flocculated solids 218 are then discharged through discharge conduit 221 as above described in connection with FIG. 1 and further dewaterized as above described in connection with FIG. 1.

The solids content of the flocculates solids 218 as they are discharged from the inclined plate thickener 123 is typically between 50 and 60% by weight. The efficiency of this thickener is many times the efficiency of the other thickeners because the total effective settling area is based upon the horizontally projected area of each plate to 213A. In turn, the reclaimed water 217 overflowing from the thickener 123 is also of greater clarity than water overflow from thickener 13 shown in FIG. 1.

While the preferred embodiments of the invention have been specifically described, it is distinctly understood that the invention may be otherwise variously embodied and used within the scope of the following claims.

What is claimed is:

1. A method of dewaterizing an aqueous slurry of fine solid particles comprising the steps of:
   A. adding a flocculent lyophobic to water and lyophilic to fine solid particles to an aqueous slurry of fine solid particles to form a mixture;
   B. charging said mixture to a thickener to separate water from said mixture by settling flocculated solids having a solids content of at least 35 percent;
   C. impinging a radiation beam on the flocculated solids transverse the direction of travel of said solids adjacent discharge means from the thickener;
   D. detecting with a detector means the impinged radiation to measure the density of the flocculated solids on which the radiation beam impinges and producing from the detector means an electrical signal proportional thereto;
   E. automatically regulating and controlling the rate of discharge of the flocculated solids from the thickener with a servovalve positioned in the conduit for discharging said flocculated solids from the thickener, said servovalve being responsive to the electrical signal produced by the detector means; and
   F. passing the flocculated solids discharged from the thickener through a foraminal conduit section while vibrating said flocculated solids to remove water therefrom.

2. A method of dewaterizing an aqueous slurry of fine solid particles as set forth in claim 1 wherein: passage of the radiation beam through the flocculated solids transverse to the direction of travel of the flocculated solids is detected and absorption of the radiation beam by the flocculated solids measured.

3. A method of dewaterizing an aqueous slurry of fine said particles as set forth in claim 1 comprising in addition:
   F. kneading the flocculated solids discharged from the thickener by passage of flocculated solids through an inclined dewaterizing screw having overflow portions to remove water therefrom.

4. A method of dewaterizing an aqueous slurry of fine solid particles as set forth in claim 3 wherein: passage of the radiation beam through the flocculated solids transverse to the direction of travel of the flocculated solids is detected and absorption of the radiation beam by the flocculated solids measured.

5. A method of dewaterizing an aqueous slurry of fine solid particles as set forth in claim 1 wherein: simultaneously with step B, subjecting the settling flocculated solids to an increase in settling area to increase the settling rate of the flocculated solids.

6. A method of dewaterizing an aqueous slurry of fine solid particles as set forth in claim 5 wherein: passage of the radiation beam through the flocculated solids transverse to the direction of travel of the flocculated solids is detected and absorption of the radiation beam by the flocculated solids measured.

7. A method of dewaterizing an aqueous slurry of fine solid particles as set forth in claim 5 wherein:
   F. kneading the flocculated solids discharged from the thickener by passage of flocculated solids through an inclined dewaterizing screw having overflow portions to remove water therefrom.

* * * * *

UNITED STATES PATENT AND TRADEMARK OFFICE
CERTIFICATE OF CORRECTION

PATENT NO. : 4,178,243
DATED : December 11, 1979
INVENTOR(S) : Leonard Messer

It is certified that error appears in the above–identified patent and that said Letters Patent are hereby corrected as shown below:

Column 12, line 6, change "said" to --solid--.

Column 12, line 8, change "F." to --G--.
Column 12, line 31, change "F." to --G.--.

*Signed and Sealed this*

*First* Day of *April 1980*

[SEAL]

*Attest:*

SIDNEY A. DIAMOND

*Attesting Officer*     *Commissioner of Patents and Trademarks*